Patented Sept. 23, 1947

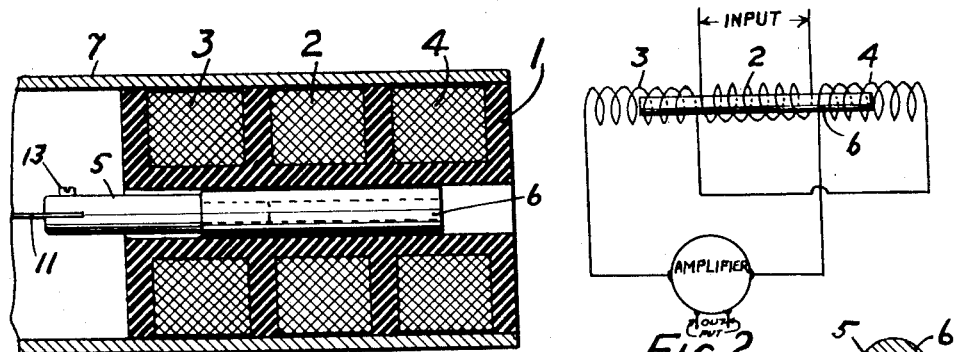
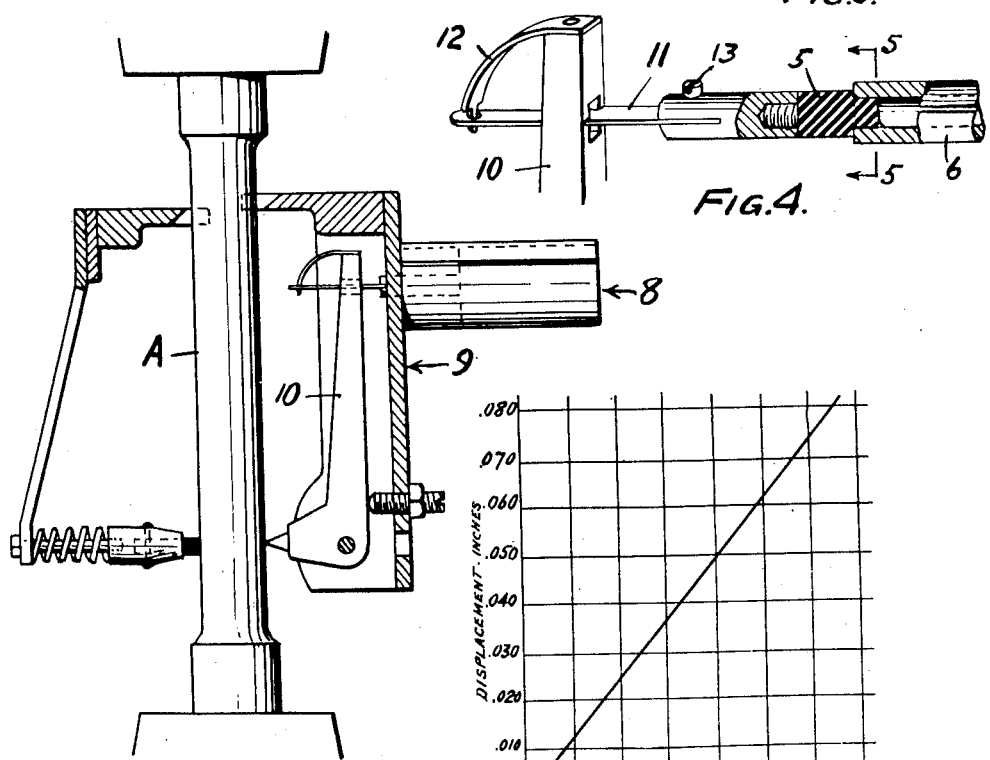

2,427,866

UNITED STATES PATENT OFFICE 2,427,866

ELECTROMAGNETIC MOTION RESPONSIVE DEVICE

William D. Macgeorge, Drexel Hill, Pa., assignor to The Baldwin Locomotive Works, a corporation of Pennsylvania Application April 25, 1944, Serial No. 532,673

6 Claims. (Cl. 171—119)

This invention relates generally to electromagnetic motion responsive devices.

While my invention is useful in many different applications, such as accelerometers, fluid pressure gages, strain gages, telemetering and other dynamic and static indicating, operating and controlling devices in any situation where the magnitude of a displacement of any type, e. g. motion, is to be measured, yet for purposes of illustration my invention is shown herein as part of an extensometer for a materials testing specimen.

A great many devices have been heretofore proposed and used for responding to very small movements and for transmitting the results of such movements to various types of instrumentation. Such transmission generally falls within the broad field of telemetering in which electrical instrumentation has been particularly prominent, although many optical and mechanical arrangements have also been used.

In certain electromagnetic types of motion responsive devices an extraordinary degree of care is required in their manufacture and operation, and even then such prior art devices are deficient in certain functional aspects, such as being frequently incapable of producing a linear output in response to a minute, finite displacement of their respective positions. Furthermore, such prior devices have not been entirely satisfactory when operating at relatively high frequencies.

One object of my invention is to provide an improved electromagnetic motion responsive device that has a high degree of precision, accuracy and sensitivity in response to minute, finite movements, without requiring the utilization of comparatively large amounts of power.

A further object of my invention is to overcome many of the deficiencies of the prior electromagnetic telemetering devices and to provide a device that has a high degree of sensitivity and linearity of output, together with being relatively economical in construction and operation, without sacrificing ruggedness and stability.

I have accomplished the foregoing, as well as other objects which will be more apparent to those skilled in the art from the disclosure herein, by providing a device having specifically three coils, the center coil of which is the primary coil and the two end coils being secondary coils, while a core of suitable magnetic material is positioned within the three coils whereby relative movement between the core and three relatively fixed coils produces a predetermined change in voltage output. The three coils are of such shapes or relative diameters as will allow movement of the core to be responsive to any given condition to be measured. In the particular arrangement shown herein, the coils are specifically of the same diameter and are axially aligned while the core moves axially within the same. The device has minimum structural complication and the flux generated by the central primary coil spreads symmetrically over the end coils with a high degree of uniformity. Due to this uniform field distribution, the movable core creates a high degree of linear output in response to minute, finite displacements.

As a result of having the center coil act as primary, the electromagnetic field assumes its simplest form, which is in contrast to the form assumed by the magnetic field when the two outer coils are energized as primaries. In the latter case, the centrally located secondary coil involves either a short circuiting of flux or results in an ineffective use of the intermediate portion of the secondary coil, which is located between the primary coils. To obtain results of the same order of precision of measurement and sensitivity to minute, finite displacements with a central secondary coil, as can readily be obtained with a similarly loaded primary coil, would necessitate greatly increased accuracy (and therefore added cost) of manufacture and assembly of coils and even then without the certainty of obtaining the desired result.

Various means, as for example any of the well-known applications of lever arms to various mechanical devices, may be used for displacing or causing the displacement of the core. The results, in terms of output, i. e., electrical difference of potential, are preferably recorded in each case by means of any suitable and well-known electrical measuring circuit and its necessary appurtenances. When my improved device is used alone, in distinction to two or more of them being coupled together, I can use the device, among other ways, as a null detector for various types of measurement and control requiring that method. If one or more additional devices of my invention are placed in combination with each other, the effect may be that of a direct reading measuring instrument, provided suitable calibration is made. Possible applications, singly or in combination, are numerous, certain of which, among others, are those applied to a stress-strain recorder, a distance recorded in a wind tunnel, liquid level measurements in various forms and such dynamic measurements as acceleration, air speed, and the like.

Other objects and advantages will be more apparent to those skilled in the art from the following description of the accompanying drawing in which:

Fig. 1 is a longitudinal section of the electromagnetic motion responsive device;

Fig. 2 is a diagram showing the basic electromagnetic circuits of the electromagnetic motion responsive device;

Fig. 3 is a side elevation of the electromagnetic motion responsive device applied to an extensometer of a materials testing machine;

Fig. 4 is a fragmentary perspective of the spring held arrangement for connecting the core to the bell crank arm of the extensometer;

Fig. 5 is a transverse section taken on the line 5—5 of Fig. 4; and

Fig. 6 is a linear output performance curve for my electromagnetic motion responsive device described herein, having output voltage values plotted as abscissae and core displacements (in inches) as ordinates.

In the illustrated embodiment of the invention disclosed herein, I have shown in Fig. 1 an electromagnetic motion responsive device, which has a relatively simple structure comprising a hollow spool 1 of suitable non-magnetic and preferably non-conducting material, such as Bakelite, rubber and the like, and provided with three annular grooves in one of which a centrally located primary coil 2 of fine enameled wire or its equivalent is wound, while two secondary coils 3 and 4 of similar wire and preferably identical with each other to the primary coil are positioned adjacent to the end of the primary coil in axial alignment therewith and equally spaced therefrom. A combined core 6 and guide stem 5, adapted to be shifted axially, fits loosely and freely into the bore of the spool which is concentric to the coils. The guide stem 5 is of suitable non-magnetic and non-conducting material, such for example as Bakelite and the like, while the hollow core 6 is longitudinally slotted, preferably throughout its length on one side only, although under high frequencies a plurality of slots or a molded core of powered magnetic material may be used, or for relatively low frequencies a solid core may be used, all of which is well-known in the art. The hollow core 6 is of suitable magnetic material and is connected to the guide stem 5 by a pressed fit.

When current is applied to the coils the slotted core 6 is suspended in mid air as a result of the electromagnetic field produced and centers itself both radially and longitudinally with respect to the three coils 2, 3 and 4, providing there is no external restraint upon the combined guide stem and core, 5 and 6, and assuming the electromagnetic field to be of uniform density and intensity. For some applications it may be desired to confine the electromagnetic field to prevent extraneous electric and magnetic effects and to protect the sensitive device against external forces and possible damage therefrom. For these purposes a slotted sleeve 7 of magnetic material such as steel my be placed over the entire surface of the coils 2, 3 and 4 and snugly fitted on the outer surfaces of the spool 1.

The electrical circuits of the electromagnetic motion responsive device are shown in Fig. 2. An input voltage, obtained from any available and suitable current source, is impressed upon the primary coil 2. This difference of potential is transformed to the secondary coils 3 and 4 (which are preferably substantially identical in construction and are connected in electrical opposition to each other) by the electromagnetic coupling effects. The measure of the coupling effects which is equivalent to the degree of instantaneous unbalance is dependent upon the relative position with respect to the three coils 2, 3 and 4 of the slotted hollow core 6. The instantaneous different variation of potential in the secondary coils 3 and 4 which is a measure (equal to $E_2 - E_2'$ as shown in Fig. 2) of the degree of unbalanced conditions existing at any instant in the electromagnetic motion responsive device is then indicated by means of an amplifier of any suitable design well-known in the art, an oscillograph preferably of the cathode ray type but not necessarily so restricted, or any other suitable electrical measuring circuit and its necessary and well-known appurtenances.

In Fig. 3 I have shown the ease and simplicity with which my improved electromagnetic motion responsive device, generally indicated at 8, may be applied to an extensometer 9 applied to a specimen A undergoing a tension or compression test. The extensometer shown herein is of the type disclosed generally in Peters Patent No. 2,085,687 and does not per se constitute a part of my present invention except in combination with my sensitive device. As the specimen A elongates or deforms, the usual bell crank arm 10 of the extensometer 9 is displaced. The core is connected with the bell crank arm by means of a very thin strip 11, preferably of metallic material, which has shoulders bearing against the bell crank arm and a tongue extending through a slot in the arm. The strip is kept rigid by the tension of a spring 12 secured to the upper end of the arm and the strip is also attached to the core by a set screw 13. Motion from the bell crank arm is transmitted to the core of the electromagnetic motion responsive device to cause an unbalanced or transient condition of unbalance which may then be indicated by an amplifier, an oscillograph, or any other well-known electrical measuring circuit and its necessary appurtenances. Depending upon the results desired, the electromagnetic motion responsive device may or may not be calibrated.

From the foregoing disclosure it is seen that I have provided an extremely simple, accurate and sensitive motion responsive device that is highly compact, sturdy and reliable.

It will of course be understood that various changes in details of construction and arrangement of parts may be made by those skilled in the art without departing from the spirit of the invention as set forth in the appended claims.

I claim:

1. An electromagnetic motion responsive pick-up device comprising two coaxially spaced secondary coils and a primary coil disposed in said space coaxially of said secondary coils in fixed end to end relation to each other, a source of alternating current adapted to be supplied to said primary coil, a core having magnetizable material disposed within said coils, the core and coils being axially movable relative to each other during actual operation of the device in performing a motion pick-up function in either of opposite directions from the center of the primary coil, and all of the coils being electrically symmetrical about said center position, and the length of the magnetizable material itself being greater than the length of said primary coil and so proportioned to the overall length of the combined coils that when the core is moved in one direction from said center the core acts to increase the flux linkage between the primary and one of the secondaries and to decrease the flux linkage with the other secondary thereby to produce a net differential voltage across the two secondaries with a magnitude which is a linear function of the axial displacement of said core from said center in either direction of relative movement therefrom.

2. The combination set forth in claim 1 further characterized in that said secondary coils are substantially identical to each other and said secondary coils are equally spaced from the ends of the primary coil.

3. The combination set forth in claim 1 further characterized by the provision of a spool-like form of non-magnetic material upon which all of said coils are concentrically wound and having a concentric bore throughout.

4. The combination set forth in claim 1 further characterized in that all of said coils are in axial alignment with each other and having a core which moves axially with respect to said coils.

5. The combination set forth in claim 1 further characterized in that the length of the magnetizable material of the core is less than the combined length of all of the coils.

6. The combination set forth in claim 1 further characterized in that the magnetizable material of the core is in one continuous length which is less than the combined length of all of the coils.

WILLIAM D. MACGEORGE.

REFERENCES CITED

The following references are of record in the file of this patent:

UNITED STATES PATENTS

| Number | Name | Date |
| --- | --- | --- |
| 1,582,497 | Waters | Apr. 27, 1926 |
| 2,026,299 | Boyd | Dec. 31, 1935 |
| 2,196,809 | Hoadley | Apr. 9, 1940 |
| 2,050,629 | Quereau et al. | Aug. 11, 1936 |

---

Certificate of Correction

Patent No. 2,427,866.  September 23, 1947.

WILLIAM D. MACGEORGE

It is hereby certified that error appears in the printed specification of the above numbered patent requiring correction as follows: Column 3, line 45, for "powered" read *powdered*; and that the said Letters Patent should be read with this correction therein that the same may conform to the record of the case in the Patent Office.

Signed and sealed this 28th day of October, A. D. 1947.

[SEAL]

THOMAS F. MURPHY,
*Assistant Commissioner of Patents.*